US 7,552,151 B2

(12) United States Patent
Betz et al.

(10) Patent No.: US 7,552,151 B2
(45) Date of Patent: Jun. 23, 2009

(54) SYSTEM, METHOD AND PROGRAM PRODUCT FOR ADDING, UPDATING AND REMOVING RDF STATEMENTS STORED ON A SERVER

(75) Inventors: Joseph P. Betz, Arlington, MA (US); Christopher R. Vincent, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 11/348,385

(22) Filed: Feb. 6, 2006

(65) Prior Publication Data
US 2007/0185930 A1 Aug. 9, 2007

(51) Int. Cl.
*G06F 12/00* (2006.01)
*G06F 17/30* (2006.01)
*G06F 17/00* (2006.01)
*G06F 7/00* (2006.01)
(52) U.S. Cl. .................... 707/203; 707/100; 707/10
(58) Field of Classification Search ................ None
See application file for complete search history.

(56) References Cited

U.S. PATENT DOCUMENTS

| | | | |
|---|---|---|---|
| 6,418,448 B1 | 7/2002 | Sarkar ................ 707/104.1 |
| 6,611,835 B1 | 8/2003 | Huang et al. ............. 707/10 |
| 6,643,684 B1 | 11/2003 | Malkin et al. ............ 709/206 |
| 6,658,402 B1 * | 12/2003 | Dutta ........................ 707/2 |
| 6,701,314 B1 | 3/2004 | Conover et al. ............ 707/7 |
| 7,133,874 B2 * | 11/2006 | Hill et al. ................ 707/102 |
| 2002/0059566 A1 | 5/2002 | Delcambre et al. ......... 717/146 |
| 2002/0174126 A1* | 11/2002 | Britton et al. ............. 707/100 |
| 2003/0208499 A1 | 11/2003 | Bigwood et al. .......... 707/100 |
| 2004/0122851 A1 | 6/2004 | Kinno et al. ............. 707/102 |
| 2004/0153508 A1 | 8/2004 | Alcorn et al. ............ 709/205 |
| 2004/0153509 A1 | 8/2004 | Alcorn et al. |
| 2004/0210552 A1* | 10/2004 | Friedman et al. ........... 707/1 |
| 2004/0249795 A1* | 12/2004 | Brockway et al. ........... 707/3 |
| 2008/0005278 A1* | 1/2008 | Betz et al. ................ 709/219 |

OTHER PUBLICATIONS

Uniform Resource Identifiers (URI): Generic Syntax, Network Working Group, The Internet Society (1998) http://www.ietf.org/rfc/rfc2396.txt.
Fully-Digital GML-Based Authoring and Delivery System for Hypermedia, IBM Technical Disclosure Bulletin, vol. 35, No. 2 (Jul. 1992).
Object Format for Parts Management of Dynamic Web Contens Creation System, 428245, Research Disclosure, 1707 (Dec. 1999).
An Unified Model of Semantic Description Format for Devices in Bluetooth Pinonet, 455154, Research Disclosure 513 (Mar. 2002).
Savage, The Data Alcehmists, p. 38-39, IEEE Spectrum (Jul. 2003).

* cited by examiner

*Primary Examiner*—Mohammad Ali
*Assistant Examiner*—Alexey Shmatov
(74) *Attorney, Agent, or Firm*—John E. Campbell; Floyd A. Gonzalez

(57) ABSTRACT

A method, apparatus, and program product for modifying Resource Description Framework (RDF) statements in a client-server system. The client-server system includes a server on which is stored RDF statements. A service request is assembled at a client connected to the server requesting modifications to an RDF statement stored in the server. The service request is sent from the client to the server, modifying the RDF statement at the server responsive to the service request. A service response is sent from the server to the client indicating if the modification of the RDF statement was successful. The service request may be an Add RDF request, an Update RDF request or a Remove RDF request. The service request and the service response are stored in memory in the client for tracking purposes.

15 Claims, 6 Drawing Sheets

SYSTEM, METHOD AND PROGRAM PRODUCT FOR ADDING, UPDATING AND REMOVING RDF STATEMENTS STORED ON A SERVER

FIELD OF THE INVENTION

This invention relates to sending Resource Description Framework (RDF) requests from a client to a server, and particularly to adding, updating and removing RDF statements stored on a server.

BACKGROUND OF THE INVENTION

Internet is becoming an important channel for retail commerce as well as business to business transactions. The number of web buyers, sellers and transactions is growing at a rapid pace. But the potential for the internet for truly transforming commerce and business still remains to be fully realized. Electronic purchases are still largely non-automated. Software techniques are required to automate several of the most time consuming stages of web surfing and buying/selling processes. Additionally, business to business web transactions are demanding seamless query facilities over all kinds of information at the front end web portal sites as well as at the back end relational databases in a connected enterprise. Uniform querying, decision support and transactional characteristics need to be present over any kind of web data despite of the fact that data mayor may not be immediately present in a single relational database. So far transactional and query capabilities are limited to data residing inside a relational database whereas text and multimedia data residing at a web site are only viewed by the use of Hyper Text Markup Language (HTML). The World Wide Web was originally built for human consumption, and although everything on it is machine-readable, everything is not machine-understandable. It is bard to automate anything on the web, and because of the volume of information the web contains, it is not possible to manage it manually.

W3C is an international industry consortium to lead the World Wide Web to its full potential by developing common protocols that promote its evolution and ensure its interoperability. The solutions so far proposed by W3C in Extensible Markup Language (XML) and Resource Description Framework (RDF) incorporate metadata to describe the data contained on the web. Metadata is "data about data" or specifically "data describing Web resources" in the context of the World Wide Web. The distinction between "data" and "metadata" is not an absolute one and it is a distinction created primarily by an application. Programs and autonomous agents can gain knowledge about data from metadata specifications.

The RDF model draws well-established principles from various data representation communities. RDF properties may be thought of as attributes of resources and in this sense correspond to traditional attribute-value pairs. The basic model consists of three object types,:

(1) Resources: All things being described by RDF expressions are called resources. A resource may be an entire Web page; for example the HTML document Overview.html available from the W3 organization. A resource may be a part of a Web page; e.g. a specific HTML or XML element within a document source. A resource may also be a whole collection of pages; e.g. an entire Web site. Resources are identified by universal resource identifiers or URIs. Anything can have URI; the extensibility of URIs allows the introduction of identifiers for any imaginable entity.

(2) Properties: A property is a specific aspect, characteristic, attribute or relation used to describe a resource. Each property has a specific meaning, defines its permitted values, the types of resources it can describe, and its relationship with other properties.

(3) Statements: A specific resource together with a named property plus the value of that property for that resource is a RDF statement. These three individual parts of a statement are called, respectively, the subject, the predicate and the object. The object of a statement (i.e. the property value) can be another resource or it can be a literal, i.e. a resource (specified by a URI) or a simple string or other primitive data type defined by XML.

A simple example statement "John Doe is the creator of the resource http://www.w3.org/home/John" has the Subject (resource) http://www.w3.org/home/John, Predicate (property) as "Creator" and Object (literal) as "John Doe". Meaning in RDF is expressed through reference to a schema. A schema is a place where definitions and restrictions of usage for properties are documented, in order to avoid conflicts in definitions of the same term, RDF uses the XML namespace facility where a specific use of a word is tied to the dictionary (schema) where the definition exists. Each predicate used in a statement must be identified with exactly one namespace, or schema. RDF model also allows qualified property value where the object of the original statement is the structured value and the qualifiers are further properties of a common resource. To represent a collection of resources, RDF uses an additional resource that identifies the specific collection. This resource should be declared to be an instance of one of the container object types, namely, (1) Bag (an unordered list of resources or literals),
(2) Sequence (an ordered list of resources or literals) and
(3) Alternative (a list of resources or literals that represent alternatives for the single value of a property).

A common use of containers is the value of a property. When used in this way, the statement still has a single statement object regardless of the number of members in the container; the container resource itself is the object of the statement. Use of metadata was so far popular in relational databases to describe attributes, number and types of columns in tables, foreign-key/primary-key relationships, views etc. in a relational schema. SQL (Structured Query Language) queries made against a relational schema are resolved by fetching metadata from data dictionaries (or repository for metadata definitions) to interpret data fetched from data files during execution of a relational operation Query executions are independent of any application domain specific features. In a similar manner, Resource Description Framework (RDF) is a foundation for representing and processing metadata and data for the World Wide Web; it provides interoperability between applications that exchange machine-understandable information on the web. The broad goal of RDF is to define a mechanism for describing resources that makes no assumptions about a particular application domain, nor defines the semantics of any application domain. RDF relies on the support of XML (extensible markup language), and its model resembles an entity-relationship diagram. In object-oriented design terminology, resources correspond to objects and properties correspond to instance variables. To facilitate the definition of metadata, RDF represents a class system much like object-oriented programming and modeling systems. A collection of classes is called a schema. Schemas may themselves be written in RDF.

Representation of "data about data" (metadata) to achieve application independent interoperable solutions carries the basic similarity between relational databases and RDF. However, RDF does not carry facilities for specifying queries making use of metadata, so far possible in a relational database. Query capabilities enable users in construct arbitrary types of data on the fly for application processing logic to apply. Additionally, relational databases are having advanced capabilities in universal servers to specify application interfaces embedded inside SQL query expressions to represent operations or methods to apply over constructed data. Such important possibilities are also missing from RDF. Lack of such facilities is the limitation of RDF to address evolving electronic business needs in its completeness.

Relational algebra incorporates algebraic operations like join, select, project, union, intersection etc. Such operations are expressed in queries against a relational schema. As opposed to this scenario, web entities are accessed by navigation through Uniform Resource Identifiers (URIs). An amalgamation of these two paradigms is the desired goal to achieve in electronic business. Relational operations over RDF definitions for resources and their attributes are possible exploiting relationships over resources and structured properly values and normalizing them in a back end relational database. Queries involving join, select, project and other relational operations can be effectively used to extract desired values and properties of resources. Without such a mechanism, web surfing in conjunction with complex automated business to business services and transactions are not possible.

Electronic commerce and services have introduced many new ways of trading allowing interaction between groups that previously could not economically afford to trade among one another. Whereas previously commercial data interchange involved mainly the movement of data fields from one computer to another, the new model for web-based commerce and services is typically dependent on intelligent processing and interactions for the transactions to take place. This involves understanding and specifying business concepts represented in the interchanged data and subsequent application of business-specific rules or methods to the interchanged data. Transactional and query facilities with embedded method interfaces can lead to such a powerful scheme. Query specifications with embedded interfaces are currently present in object relational databases or universal servers. Object relational databases with business logic bound inside the server offer distinct directions for resolving similar complex issues over XML/RDF definitions and Java classes. Transactional and query facilities to an object relational database are possible through thin client windows incorporating a persistent connectivity with the database. Persistent connectivity to a database system is not possible in a simple browser for stateless web navigation.

XML/RDF documents are interchanged based upon HTTP (Hypertext transfer protocol) which is different from IIOP (Internet inter ORB protocol). HTTP is the main communication mechanism among web browsers and servers. It is a stateless protocol implying that there is no way for the client and the server to know each others state. Since web is stateless, each transaction consumes time and resources in the setup and closing of network and database connections. For large transaction processing applications, this overhead will be significant. Internet inter ORB protocol (IIOP) is a dynamic invocation interface for the web. This protocol maintains the session between the client and the server objects until either side disconnects. It provides persistent connectivity over the web for distributed objects. The OMG (Object Management Group) is an industry consortium to create a component based software marketplace by establishing industry guidelines and detailed object management specifications to provide a common framework for application development. Common Object Request Broker Architecture (CORBA) from OMG specifies the Object Request Broker (ORB) that allows applications and programs to communicate with one another no matter where they reside on the web. The IIOP specification defines a set of data formatting rules, called CDR (Common Data Representation) which is tailored to the data types supported in the CORBA interface definition language (IDL). Electronic business transactions and query servers implementing structured query language (SQL.) processing engine require internet protocols for document transfers as well as object executions with persistent connectivity over the web. As a result, such an engine must build on top of both HTTP and IIOP. Traditional browsers for navigation need to be augmented with additional capabilities for occasional creation, maintenance and destruction of one or more client windows interfacing databases over the web for transactions and collaborations. These windows require IIOP for persistent connectivity.

A database schema can be partitioned over the web in such a way that disparate business logic and business objects can exist with relevant data and views over the web. Unifying the object paradigm and relational model paradigm is the mainstream effort across the industry. Unified model for distributed relational databases integrated with object model is the key to many storage and manipulation issues fur the electronic business. Universal relational database servers are available from different database vendors to offer general to extensibility and features for electronic business. One can extend types of attributes in tables and integrate routines defined by users written in high level programming languages. Such products offer the facilities of user-defined routines and packages. A user-defined routine (UDR) is a routine that a user creates and registers in the system catalog tables and that is invoked within a SQL statement or another routine. A function is a routine that optionally accepts a set of arguments and returns a set of values. A function can be used in SQL expressions. A procedure is a routine that optionally accepts a set of arguments and does not return any values. A procedure cannot be used in SQL expressions because it does not return a value. An UDR can be either a function or a procedure. The ability to integrate user-defined routines, packages and functions within SQL is the extensibility feature offered by universal servers and such features are useful for electronic business.

Uniform Resource Identifiers are frequently embedded in XML and HTML pages where a browser can navigate through a resource identifier to find and manipulate web objects. A resource can also identify an object relational schema component over the web. RDF documents represent metadata that could be directly derived from one or more object relational database(s). Information existing inside object relational databases presented in XMl/RDF definitions makes an information hierarchy over the web that should be seamlessly navigated and queried. This kind of seamless interoperability can prove to be very valuable in electronic business and commerce. However, these possibilities are not present in current state of the art.

This disclosure refers to URIs (Uniform Resource Identifiers), which are strings of text, defined by and available from the Internet Engineering Task Force (IETF), that uniquely identify some resource.

This disclosure refers to RDF statement updates, which are not part of the RDF standard but follow a common convention. RDF statements are composed of a subject, predicate and object and an update refers to a change only to the object of the statement.

Conventional RDF Storage Servers provide read access to stored RDF data via RDF queries sent across either HTTP (Hyper Text Transfer Protocol) or Web Services. Such systems also provide write access by supporting 'Add' and 'Remove' requests, in the form of serialized RDF graphs, from clients. None of these systems, however, allow a trackable update to an RDF statement, which means that while a statement may be removed and another added as a replacement, no relation between the two statements may be tracked. Note that in RDF, no implied relation can be determined with certainty, so such tracking must be made explicitly. Also, conventional systems do not provide implicit construction of statements or enforce semantic rules restricting which users may add, update or remove specific RDF statements.

U.S. Pat. No. 6,418,448 B1 issued to Jul. 9, 2002 to Sarkar for METHOD AND APPARATUS FOR PROCESSING MARKUP LANGUAGE SPECIFICATIONS FOR DATA AND METADATA USED INSIDE MULTIPLE RELATED INTERNET DOCUMENTS TO NAVIGATE, QUERY AND MANIPULATE INFORMATION FROM A PLURALITY OF OBJECT RELATIONAL DATABASES OVER THE WEB discloses a system for navigation through multiple documents in Extensible Markup Language and Resource Description Framework to inspect data/metadata in order to either start a transaction on selected item(s) in separate thin client window(s) with persistent connectivity through Internet Inter ORB Protocol or implicitly trigger read-only queries in Structured Query Language (SQL) represented in Resource Description Framework against a unified virtual Database defined over multiple physical disparate object relational databases over the web.

U.S. Pat. No. 6,611,835 B1 issued Aug. 26, 2003 to Huang et al. for SYSTEM AND METHOD FOR MAINTAINING UP-TO-DATE LINK INFORMATION IN THE METADATA REPOSITORY OF A SEARCH ENGINE discloses a system and method for updating search engine information that is more efficient, less time-coming, and less costly than prior techniques.

U.S. Pat. No. 6,643,684 B1 issued Nov. 4, 2003 to Malkin et al. for SENDER-SPECIFIED DELIVERY CUSTOMIZATION discloses a system and method that enables a given sending user to specify a set of delivery policies and have them used for the electronic delivery of a given message, the message potentially having several heterogeneous parts (e.g. text and pictures) each of which is handled differently, and delivered to multiple heterogeneous devices (e.g. PCs, Smartphones, fax machines), and possible to several distinct recipients.

U.S. Pat. No. 6,701,314 B1 issued Mar. 2, 2004 to Conover et al. for SYSTEM AND METHOD FOR CATALOGUING DIGITAL INFORMATION FOR SEARCHING AND RETRIEVAL discloses a system and method for searching and retrieving information stored in heterogeneous information repositories. A portal server retrieves user requests through a computer network and looks up information stored in a metadata database. For example, the metadata may be encoded in an XML/RDF format and stored in a directory server to facilitate effective searching and retrieval of information from an information repository.

U.S. Patent Application Publication No. US 2002/0059566 A1 published May 16, 2002 by Delcambre et al. for UNI-LEVEL DESCRIPTION OF COMPUTER INFORMATION AND TRANSFORMATION OF COMPUTER INFORMATION BETWEEN REPRESENTATION SCHEMES discloses a uni-level description of computer information built using basic structures of a metamodel allows model, schema, and instance information to be represented explicitly for a variety of distinct model-based representation schemes or models. Exemplary distinct representation schemes include Extensible Markup Language (XML), Resource Description Framework (RDF), developed by the World Wide Consortium, Topic Maps, and a relational database model.

U.S. Patent Application Publication No. US 2003/0208499 A1 published Nov. 6, 2003 by Bigwood et at. For METHODS AND APPARATUS FOR VISUALIZING RELATIONSHIPS AMONG TRIPLES OF RESOURCE DESCRIPTION FRAMEWORK (RDF) DATA SETS discloses a method for visualizing relationships among triples of an RDF data set. The method includes grouping subjects of at least selected ones of the triples based on commonality of at least portions of the identifiers of those subjects.

U.S. Patent Application Publication No. US 2004/0122851 A1 published Jun. 24, 2004 by Kinno et al. for IDENTIFIER GENERATING METHOD, IDENTITY DETERMINING METHOD, IDENTIFIER TRANSMITTING METHOD, IDENTIFIER GENERATING APPARATUS, IDENTITY DETERMINING APPARATUS, AND IDENTIFIER TRANSMITTING APPARATUS discloses an identifier generating method having a canonicalization process step of subjecting document data to a canonicalization process to correct fluctuation of expression; and an identifier generating step of, based on all or part of document data having been subjected to the canonicalization process in the canonicalization process step, generating an identifier uniquely specifying the document data or part thereof.

U.S. Patent Application Publication No. US 2004/0153508 A1 published Aug. 5, 2004 by Alcorn et al. for INTERNET-BASED EDUCATION SUPPORT SYSTEM, METHOD AND MEDIUM PROVIDING SECURITY ATTRIBUTES IN MODULAR, EXTENSIBLE COMPONENTS discloses providing and/or installing extensions to enhance functionality of a computer system. User roles may be provided or associated with extensible components in determining user access to the enhanced functionality.

U.S. Patent Application Publication No. US 2004/0153509 A1 published Aug. 5, 2004 by Alcorn et al. for INTERNET-BASED EDUCATION SUPPORT SYSTEM, METHOD AND MEDIUM WITH MODULAR TEXT-EDITING COMPONENT FOR USE IN A WEB-BASED APPLICATION discloses accessing a text editor, accessing a text tool, and associating text tool data with the text editor. The text editor may invoke the text tool.

FULLY-DIGITAL GML-BASED AUTHORING AND DELIVERY SYSTEM FOR HYPERMEDIA, IBM Technical Disclosure Bulletin, Vol. 35, No. 2, Pages 458-463 (July 1992), discloses a system that combines various elements of electronic publishing, including tag-based text authoring and retrieval programs, hypertext, digital multimedia, and optical storage, to easily author, revise, and distribute large hypermedia documents.

OBJECT FORMAT FOR PARTS MANAGEMENT OF DYNAMIC WEB CONTENTS CREATION SYSTEM, 428145, Research Disclosure, (December 1999, 1707) discloses an object format for exchange electronic resources over the Internet.

AN UNIFIED MODEL OF SEMANTIC DESCRIPTION FORMAT FOR DEVICES IN BLUETOOTH PICONET, 455154, Research Disclosure, (March 2003/513) discloses a framework for inter-communication among a multitude of diverse devices in a Bluetooth piconet, using a unified sematic description language.

THE DATA ALCHEMISTS, Savage, IEEE Spectrum (July 2003) discloses using knowledge-management software to extract valuable information from data residing in multiple databases and using Resource Description Format (RDF) as a way of specifying the relationship between entities.

SUMMARY OF THE INVENTION

A primary object of the present invention is to provide a system and method for a RDF storage Application Program Interface (API) for receiving Add, Update and Remove commands formatted in RDF.

It is another object of the present invention to provide a system and method of responding to Add, Update and Remove commands either with a response composed of RDF and URI mapping declaring the implicit changes made to the store RDF (in addition to the requested explicit changes) or an error response explaining why the RDF store could not make the requested changes.

It is another object of the present invention to provide a system for providing web services for implementing the described method such that clients can track the RDF statements on the server resulting from the requests the client has sent.

It is another object of the invention to provide system and method for providing a unique semantic base for constructing semantic web server/client architectures capable of enterprise level features such as revision tracking and access control.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
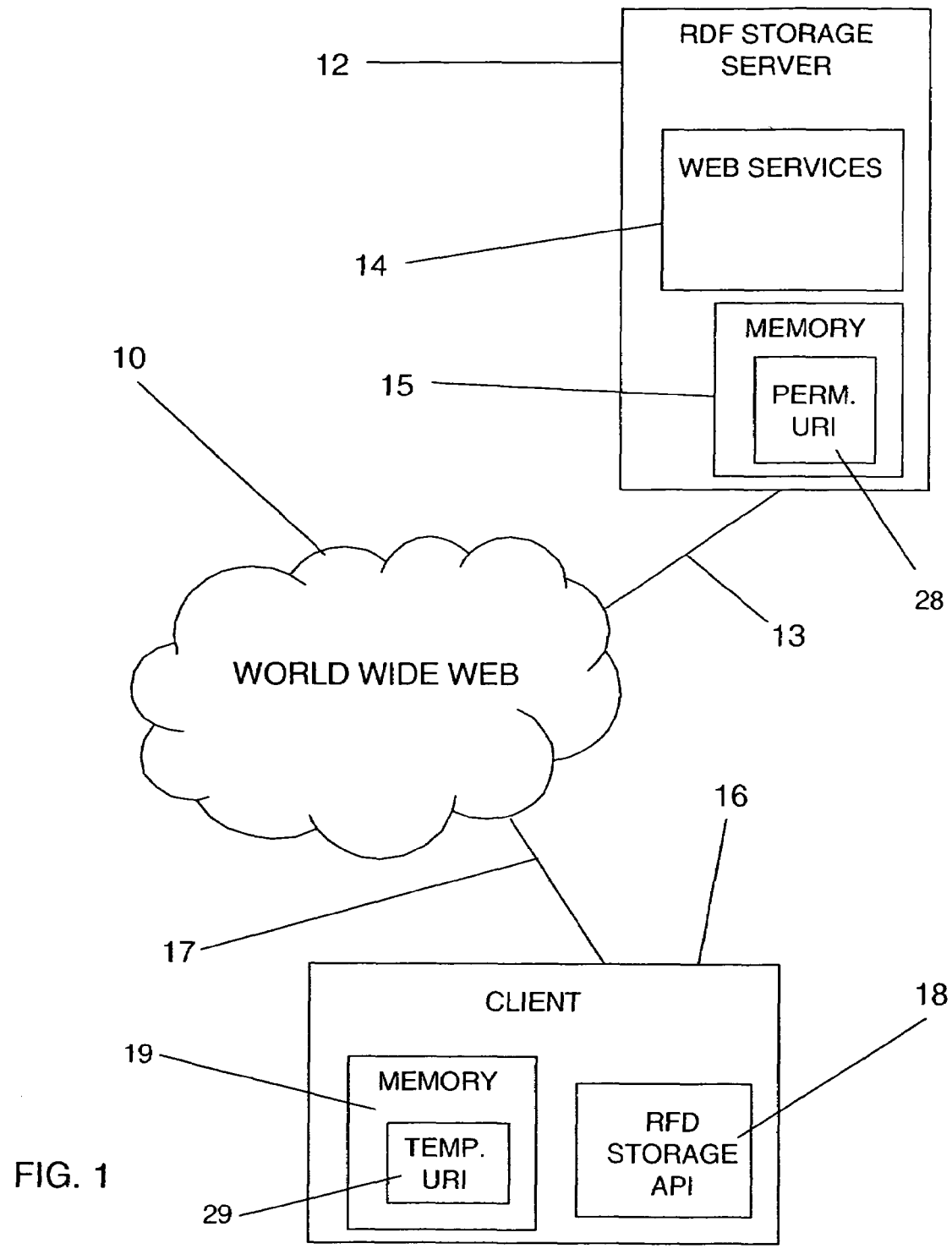
FIG. 1 is a schematic diagram of a system including an RDF storage server and a client connected to the World Wide Web for processing add/update/remove RDF web request of the present invention.

FIG. 1 illustrates a system of the present invention which includes the World Wide Web 10 to which is connected an RDF Storage server by a link 13. The RDF server 12 includes web services 14 and a memory 19 for storing RDF statements. It will be understood that the memory 19 could be or include by a file system, database, etc. RDF statements are described in RDF Primer, W3C Recommendation 10 Feb. 2004, rdf-primer-2040210, available from the W3C Working Group. Web services 14 may be as set out by the W3C working group in Web Services Architecture, 11 Feb. 2004, ws-arch-20040211, from the W3C Working Group. A client 16 is connected to the web 10 by a link. The client 16 includes an RDF Storage Application Program Interface (API) 18 which is capable of receiving Add, Update and Remove commands formatted in RDF and responding either with a response composed of RDF and a URI mapping declaring the implicit changes made to the store RDF (in addition to the requested explicit changes) or an error response explaining why the RDF store could not make the requested changes. The client 16 also includes a memory 19 for storage, as will be explained. Even though only one client 16 is shown for simplicity, it will be understood that additional clients may be added, as desired. Web Services 15 includes a capability such that clients can track the mentioned RDF commands on the server 12 resulting from the requests the client 16 has sent. It will be understood that by virtue of the links 13 and 17 connecting the server 12 and client 16 to the web, respectively, the server 12 and client 17 may become part to the web 10.

Figure 2:
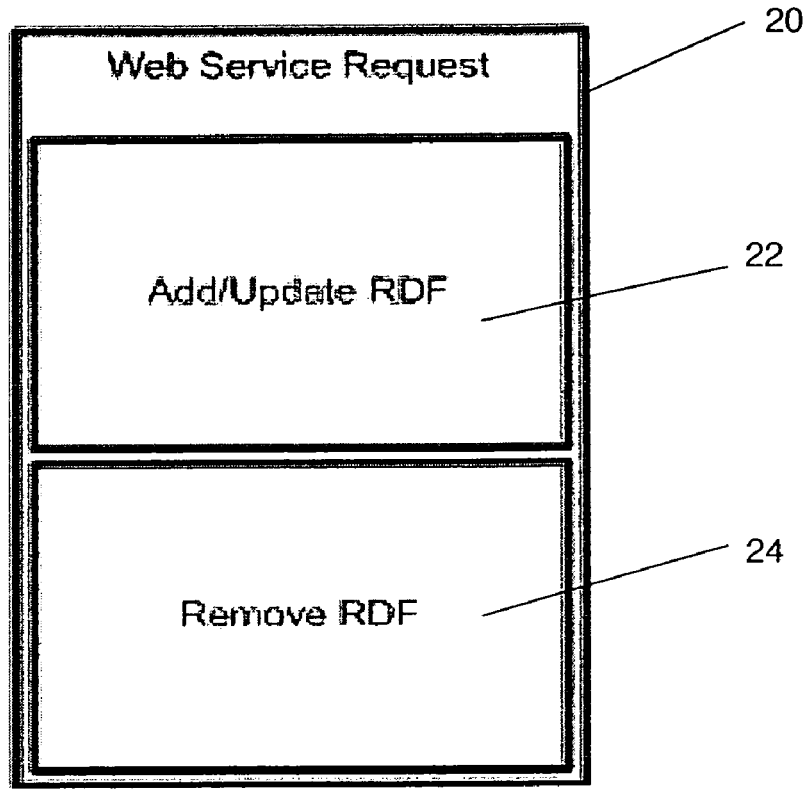
FIG. 2 is an illustration of an add/update/remove RDF of a web service request used in the system of FIG. 1.
Figure 3:
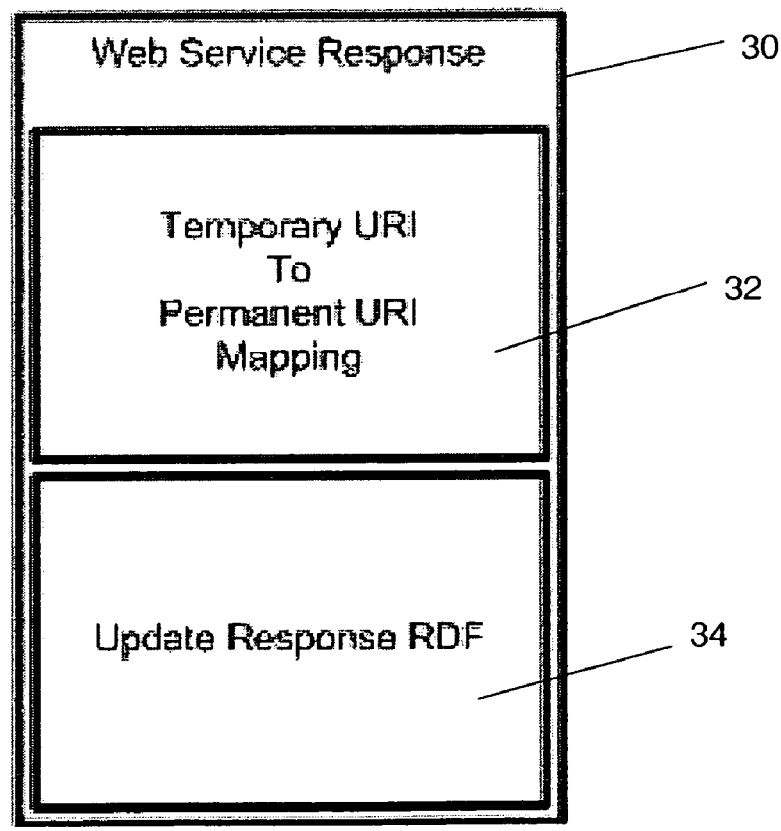
FIG. 3 is an illustration of a add/update web service response used in the system of FIG. 1.

FIG. 2 is an illustration of a web service request 20 sent from the client 16 to the server 12. The web service request 20 may include an Add/Update command 22, or a Remove RDF command 24, or both. FIG. 3 is a block diagram showing the server memory 15 of FIG. 1 wherein the server memory 15 has a portion 26 for URIs with a permanent prefix. The method for communicating between server and client makes use of the semantic meaning of RDF statements.

By reserving prefixes of URIs for internal resource allocation by the server 12 and by applying RDF reification, a distinction between new and existing RDF statements is achieved. As is well known, reification is a process for uniquely identifying an RDF statement where additional statements are added to connect to unique identifier for the statement with the parts of the statement (subject, predicate and object). After reification of a statement, the statement is said to be reified. Reification URIs with a permanent prefix (URI allocated by the RDF Storage Server 12) represent statements which are already stored on the server 12 in a memory portion 28 shown in FIG. 1. Reification URIs with a temporary prefix (URI allocated by the client 16 on a per request basis) represent statements not yet stored on the server 12. The distinction between new and stored statements allows clients 16 to request additions and updates via a single RDF graph where statements to be added are reified in the RDF with a temporary URI prefix. Statements to be modified are represented by their permanent URI in 28. Using these semantics, an update request is formed by a statement with a permanent URI (representing some statement) as the resource, the "rdf:object" URI (as defined by the RDF specification) as the predicate and the new object as the object. Also using these semantics, to remove a statement, the permanent URI representing the statement is identified for removal by including it's "rdf:type" (another URI defined in the RDF specification) statement in the RDF graph of removals. These semantics apply not just to reified statements, but all server allocated resources.

URI mappings are defined to associate temporary URIs to permanent URIs that have been allocated for them by the server 12. Also, an update response is defined as RDF which contains all statements implicitly resulting from a request, which means the server 12 has added these statements to the store 28 in addition to the requested additions. Implicit statements are used to specify additional properties of a reified statement such as an update revision number created semantically by the server 12 as a statement with the permanent URI representing some statement as the subject, a reserved URI such as 'revisionNumber' for the predicate and a number value for the object.

Figure 4:
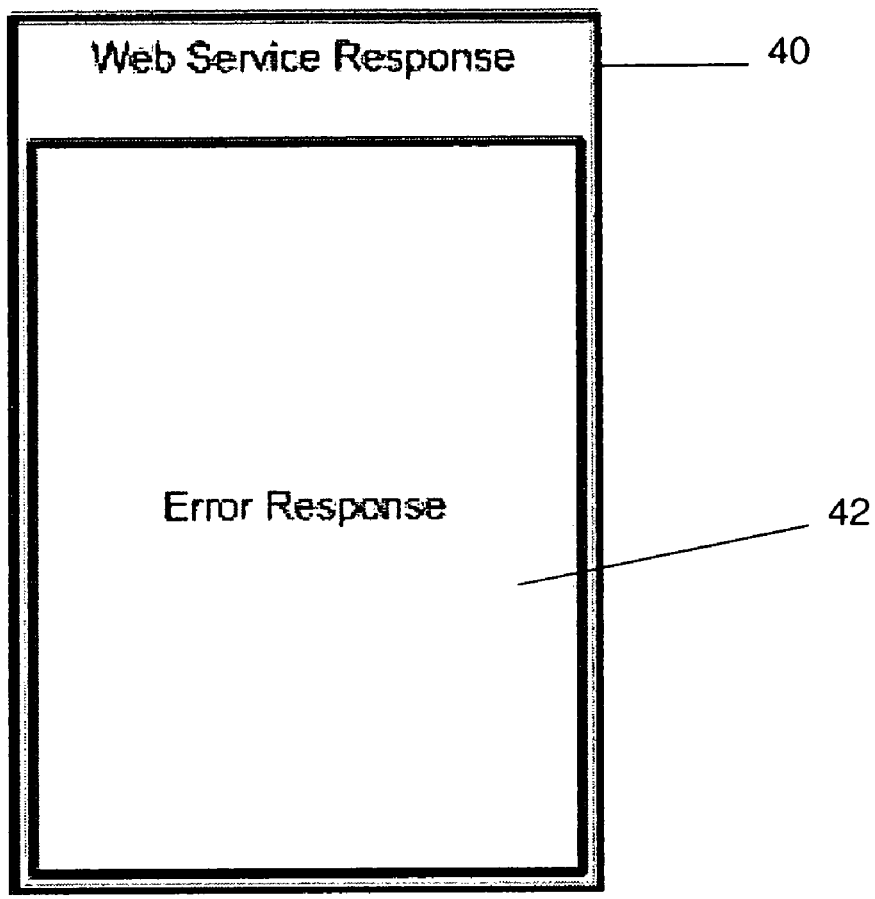
FIG. 4 is an illustration of an error web service response used in the system of FIG. 1.

FIGS. 3 and 4 illustrate web service responses from the server 12 to the client 16 in response to a request 20 of FIG. 2 sent from the client 16 to the server 12. Generally, the update response RDF 30 reports arbitrary statements created implicitly by a server 12 to the client 16 for tracking, which works in conjunction with the resource allocation provided by the URI mappings to provide server/client semantics for tracking RDF modifications requested both explicitly by a client 16 and implicitly by the server 12.

The method for communicating between server 12 and client 16 requires the client 16 to send a message 20 with a packet containing the Add/Update RDF 22 and a packet containing the Remove RDF 24, all conforming to the semantics defined above. The web service response for a valid request is composed of a URI mapping 32 and an update response RDF 34 packet. If the web service request is in any way invalid, either semantically or due to an error in the implementing system, the response 40 of FIG. 5 is returned which includes an error response 42 containing an explanation of the problem(s).

The web service 14 includes a definition 'update' facility that a client 16 calls with a web service containing only two attachments, one with the Add/Update RDF 22 and another with the Remove RDF 24. The server 12 applies the semantic rules for resources it is responsible for allocating, and returns a web service response. If the response is a response 30 for a valid request, the server 12 includes the URI mapping 32 as a list of key value pairs in the web service response body and returns the update response RDF as an attachment 32. If the request is invalid, and error response 40 is returned with error messages 42 in the web service body 40.

When a statement addition 22 is requested by a request 20 from by a client, the client 16 specifies a temporary URI as shown at 29 in FIG. 1, but the server does not store this temporary URI. Instead, the server 12 allocates a permanent URI in 28. It will be understood that the memory 15 may be or include a filesystem, database, etc. After allocation, then the temporary URI and permanent URI are included together in the response to the client so the client may store them in 29 and track the permanent URIs belonging to the statements it requested to have added. Temporary and permanent URI use as described is not restricted to reified statements; they may be used in the server 12 for all resource allocation where the server must enforce data integrity.

Figure 5:
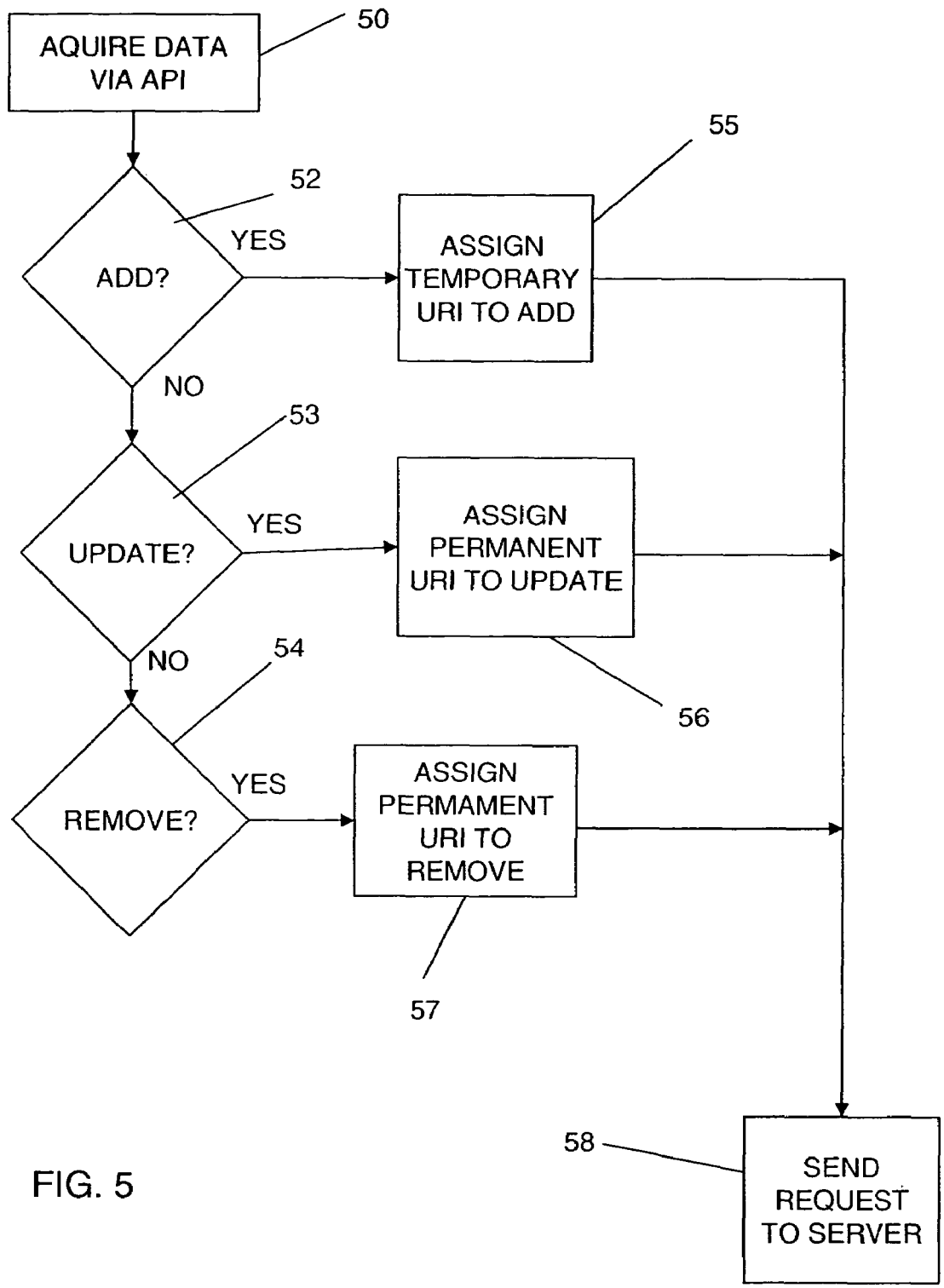
FIG. 5 is a flowchart of a program of the client of the system of FIG. 1 for providing a facility for assembling and sending add/update/remove web service requests to the server.

FIG. 5 is a flowchart of a program of the system of FIG. 1 for providing a facility wherein the client 16 builds and sends RDF statements to the server 12. At 50, the client 16 acquires data for the add/update/remove RDF requests via and API 18. At 52, the program determines if the statement is an add statement, at 53, the program determines if the statement is an update statement, and at 54, the program determines if the statement is a remove statement. If at 52, the statement is an add statement, a temporary URI is assigned at 55. If the statement at 53 is an update statement, the program at 56 assigns a permanent URI prefix to the update in accordance with the previously discussed semantic rules in order to build the request of FIG. 2. If the request is to remove an RDF statement is determined at 54, the permanent URI of the statement to remove is assigned at 57. The results of 55, 56, and 57 is included in a request at 58 to be sent to the server 12. It will be understood that the order and determination of the requests may be changed or processed in a different order, as desired, the flowchart of FIG. 5 being only one way of building the web service requests of FIG. 2.

Figure 6:
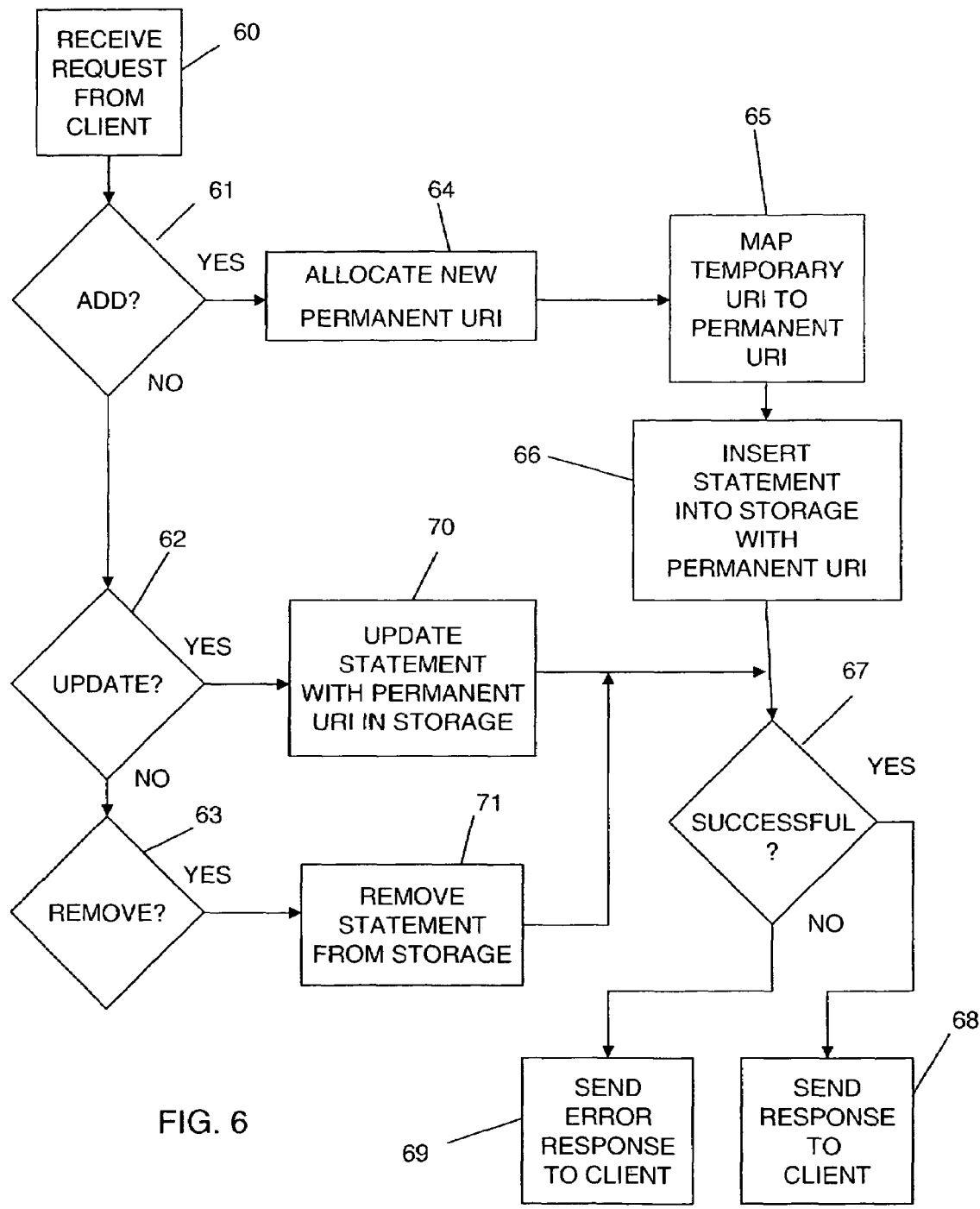
FIG. 6 is a flowchart of a program of the server of the system of FIG. 1 for providing a facility for processing add/update/remove requests sent by the client.

FIG. 6 is a flowchart of a program for providing a facility for processing the web service request 20 by the server 12. At 60, the server 12 receives the web service request 20 from the client 16. At 61, the program determines if the request is an add statement, at 62 the program determines if the request is an update, and at 63 the program determines if the request is a remove. If the request is an add, the program allocates a new permanent URI at 64. At 65 the program maps the temporary URI to the permanent URI. At 66, the program inserts a statement into storage 28 with the permanent URI. A check is made at 67 to see if the operation was successful. If the check at 67 is yes, the web service response 30 of FIG. 3 is sent to the client 16. If the check at 67 is no, an error service response 40 of FIG. 4 is sent to the client with reasons for the error listed in 42. It the request is determined to be an update at 62, at 70 the program updates the statement with the permanent URI in storage 28, and a check is made at 67 to see if the update was successful. If the operation was successful, a successful response is sent at 68, and if not, the error response is sent at 69. If the request as determined at 63 is a remove, at 71 the URI requested to be removed is removed from storage 28. As previously discussed, a check is made at 67 to see if the remove was successful.

Figure 7:
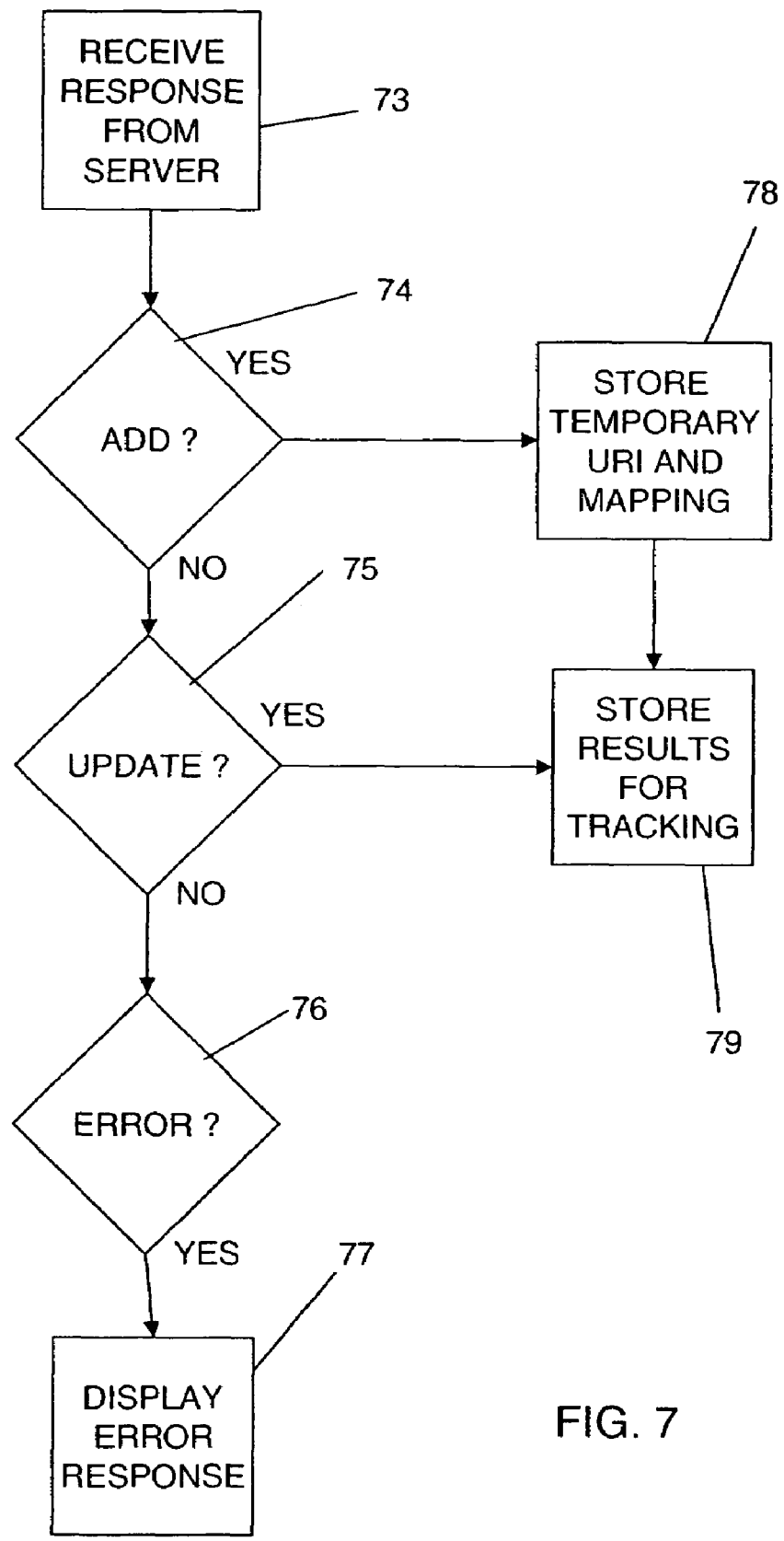
FIG. 7 is a flowchart of a program of the client of the system of FIG. 1 for providing a facility for processing web service responses from the server.

FIG. 7 is a flowchart of a program for providing a facility for processing the web service responses 30 and 40 by the client 16. At 73, the client 16 receives a web service response. If the response is an add as determined at 74, the temporary URI and mapping from the permanent URI to the temporary URI is stored in the memory portion 29 of the client 16. The results of the add is stored at 79 for tracking. If the web service response includes a successful update as determined at 75, the successful results is stored at 79 for tracking. It is assumed that the remove was previously stored for tracking, or it may also be stored at 78. If the response determined at 76 as an error response 40, the error response reasons 42 are displayed at 77.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for modifying Resource Description Framework (RDF) statements in a client-server system, the method comprising:
   storing RDF statements in a server storage device, said RDF statement having a set Universal Resource Identifier (URI); assembling a service request at a client connected to the server storage device from an Application Program Interface (API) at the client for requesting an Add RDF request to add an RDF statement to RDF statements stored in said server storage device; sending the service request from said client to said server storage device; applying RDF reification to the RDF statement to form a reified RDF statement responsive to said service request where statements to be added are reified in the RDF with a temporary URI prefix; assigning a temporary URI to the RDF statement to be added, mapping in the server storage device, the temporary URI to a permanent URI; storing in the server storage device, the permanent URI for the RDF statement being added; sending in a service response from the server storage device to the client, the mapping and temporary URI; storing the mapping and temporary URI in the client; and sending in said service response an indication indicating if the Add RDF request was successful.

2. The method according to claim 1 further comprising assembling a further service request including an update service request for modifying a present RDF statement, and, when the service request includes an update and the modification was not successful, including in the service response an error response having an explanation of why the modification was not successful.

3. The method according to claim 1 further comprising assembling a further service request including a Remove RDF request for removing an RDF statement which Remove RDF request comprises assigning a set Uniform Resource Identifier (URI) to the RDF statement to be removed, and including the set URI in said service request such that the set URI to be removed which is stored in said server is removed.

4. The method according to claim 1 further comprising storing the service request and the service response in the client for tracking purposes.

5. The method of claim 1 wherein said URI includes a resource, a predicate, and an object, and said assembling a service request for an update includes assembling a permanent URI representing some statement as the resource, an "rdf:object" URI as the predicate and a new object as the object, wherein said statement is reified.

6. An apparatus for modifying Resource Description Framework (RDF) comprising:
   a server including a memory for storing RDF statements, said RDF statement having a set Universal Resource Identifier (URI); a client connected to said server including a facility for assembling from an Application Program Interface (API) at said client, a service request for requesting an Add RDF request to add an RDF statement to RDF statements stored in said server; a facility in said client for sending the service request from said client to said server; a facility for applying RDF reification to the RDF statement to form a reified RDF statement responsive to said service request where statements to be added are reified in the RDF with a temporary URI prefix; a facility in said client for assigning a temporary URI to the RDF statement to be added; a facility in said server for mapping the temporary URI to a permanent URI; a facility in said server for storing the permanent URI for the RDF statement being added; a facility in said server for sending in a service response from the server to the client, the mapping and temporary URI; a facility in said client for storing the mapping and temporary URI in the client; and a facility in said server for sending in said service response an indication indicating if the Add RDF request was successful.

7. The apparatus according to claim 6 further comprising a facility in said server for assembling a further service request including an update service request for modifying a present RDF statement, and a facility in said server wherein, when the service request includes an update and the modification was not successful, including in the service response an error response having an explanation of why the modification was not successful.

8. The apparatus according to claim 6 further comprising a facility for assembling a further service request including a Remove RDF request for removing an RDF statement and a facility for assigning a set Uniform Resource Identifier (URI) to the RDF statement to be removed, and including the set URI in said service request for said Remove RDF request such that the set URI to be removed which is stored in said server is removed.

9. The apparatus according to claim 6 further comprising tracking storage in said client for storing said service request and said service response for tracking purposes.

10. The apparatus of claim 6 wherein said URI includes a resource, a predicate, and an object, and said facility in said client for sending the service request includes the service request for an update including a permanent URI representing some statement as the resource, an "rdf:object" URI as the predicate and a new object as the object, wherein said statement is reified.

11. A program product for modifying Resource Description Framework (RDF) statements in a client-server system, the program product comprising:
   a computer readable storage medium having recorded thereon computer readable program code for performing the method comprising:
   storing RDF statements in a server, said RDF statement having a set Universal Resource Identifier (URI); assembling a service request at a client connected to the server from an Application Program Interface (API) at the client for requesting an Add RDF request to add an RDF statement to RDF statements stored in said server;
   sending the service request from said client to said server; applying RDF reification to the RDF statement to form a reified RDF statement responsive to said service request where statements to be added are reified in the RDF with a temporary URI prefix; assigning a temporary URI to the RDF statement to be added, mapping in the server, the temporary URI to a permanent URI; storing in the server, the permanent URI for the RDF statement being added; sending in a service response from the server to the client, the mapping and temporary URI; storing the mapping and temporary URI in the client; and sending in said service response an indication indicating if the Add RDF request was successful.

12. The program product according to claim 11 wherein said method further comprises assembling a further service request including an update service request for modifying a present RDF statement, and, when the service request includes an update and the modification was not successful, including in the service response an error response having an explanation of why the modification was not successful.

13. The program product according to claim 11 further comprising assembling a further service request including a Remove RDF request for removing an RDF statement which comprises assigning a set Uniform Resource Identifier (URI) to the RDF statement to be removed, and including the set URI in said service request such that the set URI to be removed which is stored in said server is removed.

14. The program product according to claim 11 wherein said method further comprises storing the service request and the service response in the client for tracking purposes.

15. The program product of claim 11 wherein said URI includes a resource, a predicate, and an object, and said assembling a service request for an update of said method includes assembling a permanent URI representing some statement as the resource, an "rdf:object" URI as the predicate and a new object as the object, wherein said statement is reified.

* * * * *